(12) United States Patent
Martin et al.

(10) Patent No.: US 8,078,517 B1
(45) Date of Patent: *Dec. 13, 2011

(54) SYSTEMS AND METHODS FOR MONITORING REMITTANCES FOR REPORTING REQUIREMENTS

(75) Inventors: Joe Ray Martin, San Antonio, TX (US); Michael Wayne Lester, San Antonio, TX (US); Patrick William Walker Evans, San Antonio, TX (US); Patrick Robert Ernst, Helotes, TX (US); Ronald David Young, San Antonio, TX (US); Marie Elizabeth Hollinger, Helotes, TX (US); Omar Alejandro Pina, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 308 days.

This patent is subject to a terminal disclaimer.

(21) Appl. No.: 12/255,116

(22) Filed: Oct. 21, 2008

(51) Int. Cl.
*G06Q 40/00* (2006.01)
(52) U.S. Cl. ............... 705/35; 705/39; 705/44; 705/45
(58) Field of Classification Search ............ 705/35, 705/39, 44, 45
See application file for complete search history.

(56) References Cited

U.S. PATENT DOCUMENTS

| | | | |
|---|---|---|---|
| 7,805,369 B2 * | 9/2010 | Song et al. ............. | 705/44 |
| 2002/0045476 A1 | 4/2002 | Poole et al. | |
| 2002/0062249 A1 | 5/2002 | Iannacci | |
| 2002/0100808 A1 | 8/2002 | Norwood et al. | |
| 2005/0168523 A1 | 8/2005 | Takiguchi | |
| 2006/0251339 A1 * | 11/2006 | Gokturk et al. ............. | 382/305 |
| 2007/0110277 A1 * | 5/2007 | Hayduchok et al. ......... | 382/101 |
| 2007/0244777 A1 | 10/2007 | Torre et al. | |
| 2008/0270206 A1 * | 10/2008 | Gillum ............................ | 705/7 |
| 2008/0294551 A1 | 11/2008 | Degenhart et al. | |

OTHER PUBLICATIONS

Csoka, Louis V.: "Combating Money Laundering: A Primer for Financial Services Professionals", HeinOnline, 20 Annual Review of Banking & Financial Law, p. 311, 2001.

* cited by examiner

*Primary Examiner* — Lindsay M Maguire
*Assistant Examiner* — Hao Fu
(74) *Attorney, Agent, or Firm* — Brooks, Cameron & Huebsch PLLC

(57) ABSTRACT

Financial transactions may be monitored for reporting requirements and regulatory compliance. A system provides for receipt of remittances, recognition of payment documents, storage of transaction information, and compliance verification by matching one or more cash equivalent transactions (CETs) made by an individual to determine if the aggregate of the transactions should be reported to meet compliance regulations. Images of the documents may be reviewed by an analyst to determine an account number and/or routing number associated with imaged document. If the information associated with the document reviewed has not been previously reviewed, it may be placed on a list of documents associated with CET transactions such that the document may be determined to be a CET in subsequent encounters with the document without human intervention.

21 Claims, 8 Drawing Sheets

SYSTEMS AND METHODS FOR MONITORING REMITTANCES FOR REPORTING REQUIREMENTS

CROSS REFERENCES

The subject matter described in this application is related to subject matter disclosed in the following commonly assigned applications: U.S. patent application Ser. No. 12/255,107; and U.S. patent application Ser. No. 12/255,124, each filed on even date, and entitled "Systems and Methods for Monitoring Remittances for Reporting Requirements."

BACKGROUND

The United States another other governments require that certain information be reported in an effort to thwart terrorism and other criminal activities. In the United States, the law requires that each person engaged in a trade or business who, in the course of that trade or business, receives more than $10,000 in cash in one transaction or in two or more related transactions, file a Form 8300. The form is filed with the Internal Revenue Service (IRS) and the Financial Crimes Enforcement Network (FinCEN). Any transactions conducted between a payer (or its agent) and the recipient in a 24-hour period are considered to be related transactions. Transactions may be related even if they occur over a period of more than 24 hours if the recipient knows, or has reason to know, that each transaction is one of a series of connected transactions.

Accordingly, financial institutions are required to monitor cash and cash equivalent remittances that aggregate up to $10,000. Because financial institutions may receive payment remittances in the form of personal checks or cash equivalents, such as money orders, traveler checks, etc., which share common physical features as personal checks, it is difficult to automate a process to differentiate between cash equivalent payments and personal check payments. The effect is that analysts monitor payment activity and may review each and every account that aggregates up to $10,000 in remittances. Because a very large percentage of the $10,000 aggregate alerts are false positives, this leads to a waste of resources and creates unnecessary work for the analysts.

SUMMARY

Financial transactions may be monitored for reporting requirements and regulatory compliance. A system provides for receipt of remittances, recognition of payment documents, storage of transaction information, and compliance verification by matching one or more cash equivalent transactions (CETs) made by an individual to determine if the aggregate of the transactions should be reported to meet compliance regulations. Images of the documents may be reviewed by an analyst to determine an account number and/ or routing number associated with imaged document. If the information associated with the document reviewed has not been previously reviewed, it may be placed on a list of documents associated with CET transactions such that the document may be determined to be a CET in subsequent encounters with the document without human intervention.

This summary is provided to introduce a selection of concepts in a simplified form that are further described in the detailed description section. This summary is not intended to identify key features or essential features of the claimed subject matter, nor is it intended to be used to limit the scope of the claimed subject matter.

DETAILED DESCRIPTION

Figure 1:
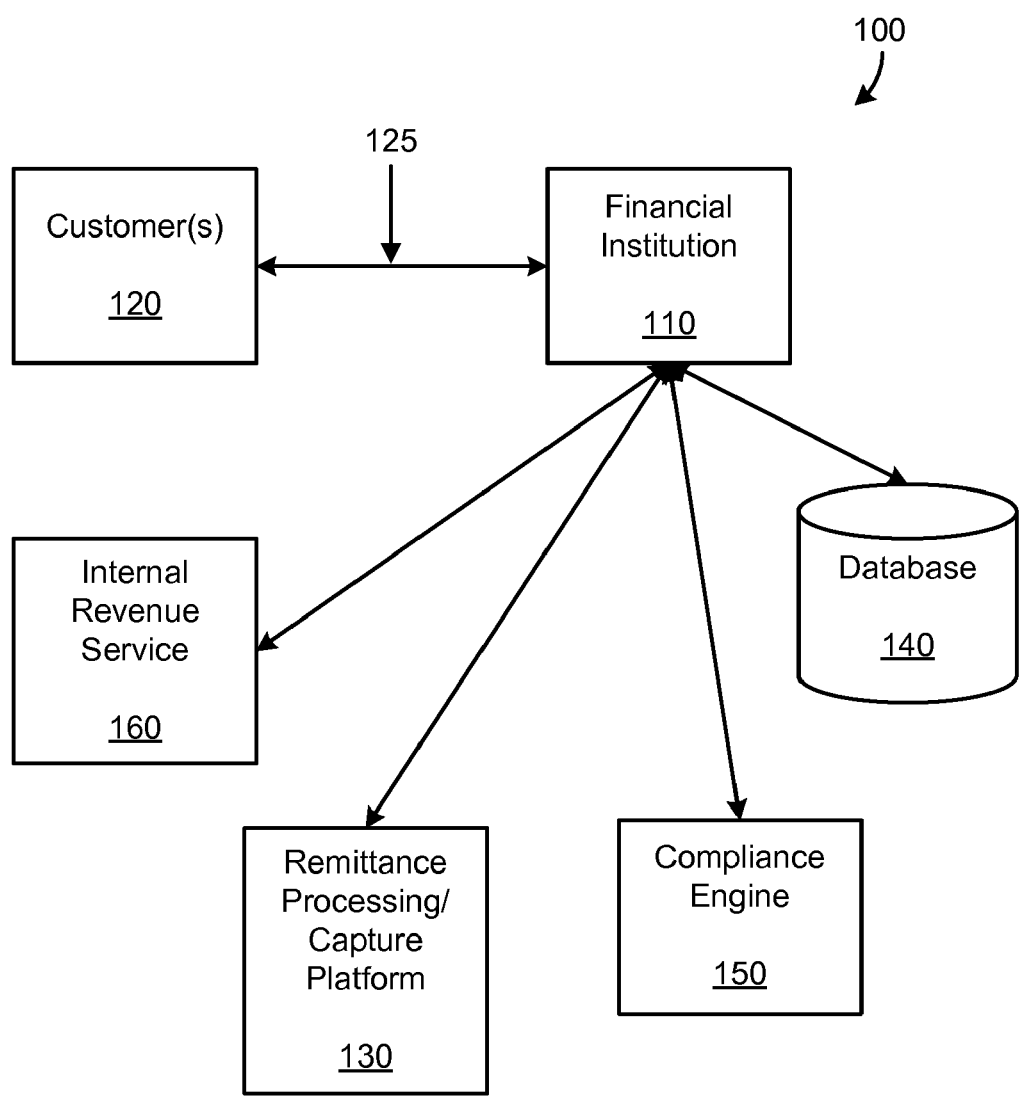
FIG. 1 is an example system for monitoring financial transactions for reporting requirements and compliance.

Referring to the drawings, FIG. 1 is an example system 100 for monitoring financial transactions for reporting requirements and compliance. The system 100 provides for receipt of payment remittances, recognition of payment documents, storage of transaction information and compliance verification by matching one or more financial transactions (cash equivalent transactions) by an individual (i.e., a customer or member) to determine if the aggregate of the transactions should be reported to meet compliance requirements. The system 100 provides a cost effective way to review financial transactions in the form of cash equivalents (e.g., a negotiable financial instrument such as a cashier's check, money market holdings, short-term government bonds, Treasury bills, etc., that have a very high degree of convertibility into cash) that frees resources (e.g., analysts) to investigate actual alerts associate with cash equivalent transaction (CETs) rather than a myriad of false positive alerts.

In accordance with FIG. 1, a financial institution 110 may receive remittances 125 by mail from one or more customers 120. For example, the customers 120 may be policyholders of insurance products offered by the financial institution 110. The insurance products may include property and casualty (P&C) and life. In the insurance industry, P&C typically includes all risks other than life and health. The financial institution 110 may be part of a larger P&C or general insurance industry that helps underpin the economy by assuming the financial risk inherent in many personal and business activities. In other words, the losses of a few are shared among all policyholders, making the lives of individuals and businesses more financially stable and making it easier to plan for the future. Likewise, life insurance plays a role by providing insurance against unexpected events and helping customers 120 plan their financial future. Traditional insurance, such as life, spreads risk across many persons to insure against loss of life.

The remittances 125 may be processed by a remittance processing/capture platform 130 in accordance with the type of remittance 125 (e.g., cache, check, or cash equivalent) contained within an envelope received by the financial institution 110 (or its processor). The remittance processing/capture platform 130 may be a high-speed remittance processor, such as that available from OPEX of Morristown, N.J. The remittance processing/capture platform 130 may load unopened mail on a feed conveyor, and sort checks and documents in a manner suited for clearing by the financial institution 110.

Imaging of the checks and documents, which is a process whereby images or checks, cash equivalents and other documents are captured by an image camera, may take place in-line with an extraction process to avoid any human intervention until after an image of the transaction has been secured by the remittance processing/capture platform 130.

The imaging process may be accomplished on medium to high speed processing equipment, such as equipment manufactured by IBM of Armonk, N.Y.; NCR of Dayton, Ohio; Unisys of Blue Bell, Pa.; Banc Tec of Dallas, Tex., etc., and is normally performed in financial institution back offices for the capture, sorting, and distribution of checks and other Magnetic Ink Character Recognition (MICR) encoded documents. The "MICR line" refers to the numbers, which may include the bank routing number, account number, check number, check amount, and other information, that are printed near the bottom of a check in magnetic ink in accordance with generally applicable industry standards.

The remittance processing/capture platform 130 stored imaged checks and documents in a digitized format. For example, information obtained by the remittance processing/capture platform 130 may be stored in a database 140. Captured images of paper items processed by the remittance processing/capture platform 130 may be stored in the database 140 for later retrieval and processing by downstream systems and for archival purposes. Transaction data and information associated with the images may be stored in the database 140 for each remittance received by the financial institution 110. While the database 140 is illustrated as a single database, the database 140 may be configured as a plurality of separate or disparate databases interconnected through a network system via any number of switches, such as a local area network (LAN), a wide area network (WAN), an intranet, an extranet, the Internet, etc.

Data may be extracted from the database 140 and processed by a compliance engine 150. The compliance engine 150 may monitor and analyze transactions against industry and internal lists to detect high risk entities. The compliance engine 150 may be a crime and compliance software package available from Norkom Technologies. Industry lists, such as OFAC, Bank of England, EU and OFSI, may be used to identify high-risk individuals and businesses, including known terrorists, fraudsters, money launderers, politically exposed persons and black listed persons, companies or countries. The lists may be accessed to determine the risk associated with a particular remittance 125 associated with a customer 120.

The compliance engine 150 may make matches against watch lists, in real time or by batch, using a combination of comprehensive matching techniques and analytics. For example, name matching may be augmented with techniques such as fuzzy logic, free text and exact matching to uncover hidden matches and associations. Multiple parameters may be matched, including phone numbers, date of birth, address, country and transactional information. When matches are made, an alert is may be sent to an investigator or analyst.

The system 100 may include a computer useable medium and a computer device with a processor. As used herein, a "computer useable medium" includes a non-volatile medium (e.g., a magnetic medium, hard disk, a solid state disk, optical storage, Flash memory, electrically eraseable programmable read only memory), a volatile medium (e.g., RAM), or an installation medium (e.g., a CD-ROM, a floppy disk, a removable disk, etc.), on which computer programs are stored for loading into the computer device.

The computer device may be any type of computer device with a processor, such as a desktop computer, a laptop computer, a palmtop computer, a network computer, a personal digital assistant (PDA), an embedded device, a smart phone, or any other suitable computer device. For example, the system 100 may include one or more server computers with a processor, an area of main memory for executing program code under the direction of the processor, a storage device for storing data and program code and a bus connecting the processor, area of main memory and the storage device.

The database 140 may be stored on the storage device, as well as a data communications device, such as a modem, connected to the bus for wirelessly and/or non-wirelessly connecting the computer to a local area network (LAN), a wide area network (WAN), an intranet, an extranet, the Internet, etc. software is stored in the computer useable medium and executes under the direction of the processor.

The software may cause the processor to provide and configure the database 140 to store thereon transaction records associated with financial transactions corresponding to the customers 120 and remittances 125. Each transaction record may be configured to include alphanumeric data pertaining to parameters associated with a particular financial transaction. Such parameters may include alphanumeric data grouped into fields associated with items that may include a payer name, payer personal specifics, a transaction instrument, an account number, a PIN, a digital signature, etc., some of which may be obtained from the MICR line.

Figure 2:
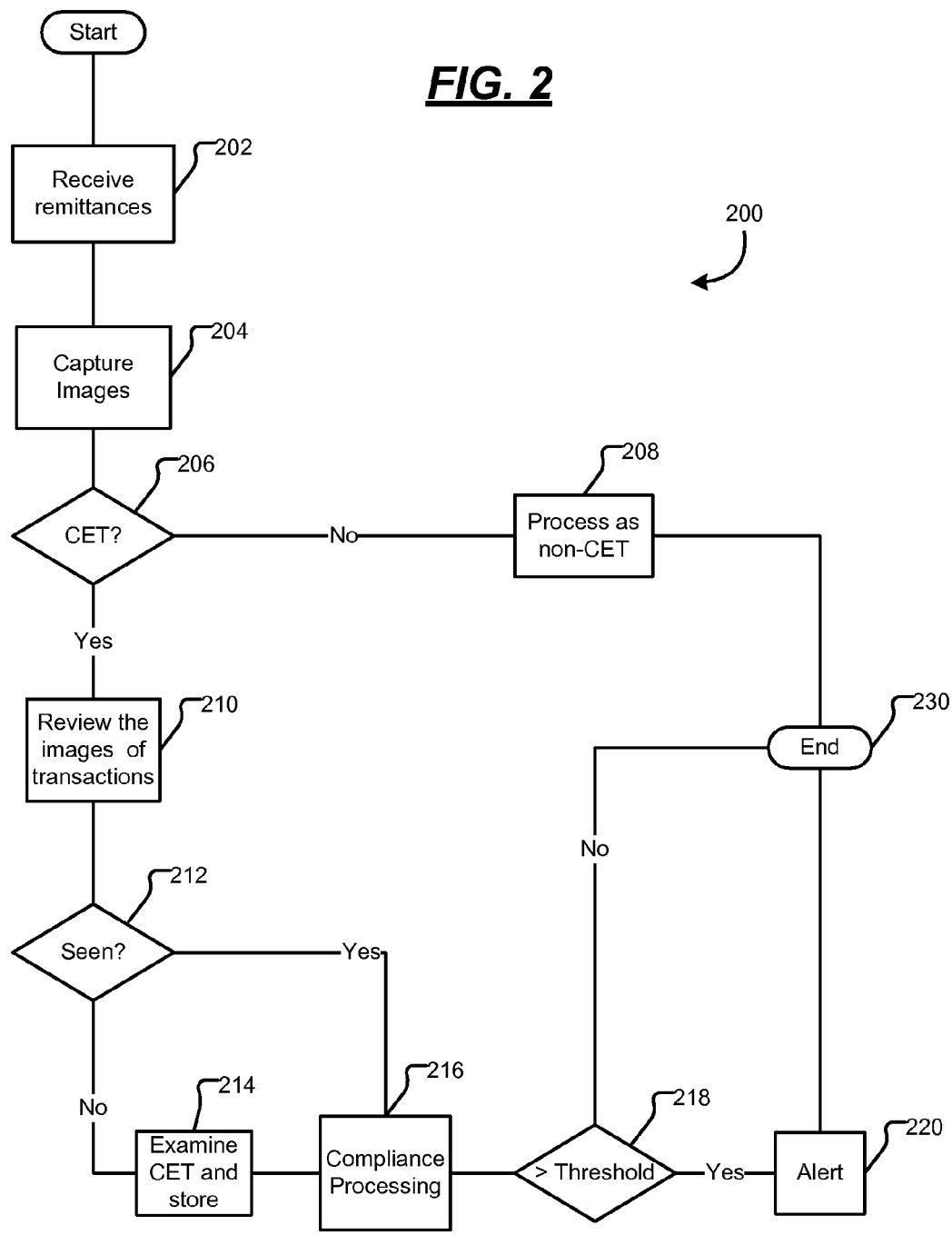
FIG. 2 is an example operational process flow for receiving remittances and determining compliance of cash equivalent transactions (CET) with statutory regulations.
Figure 3:
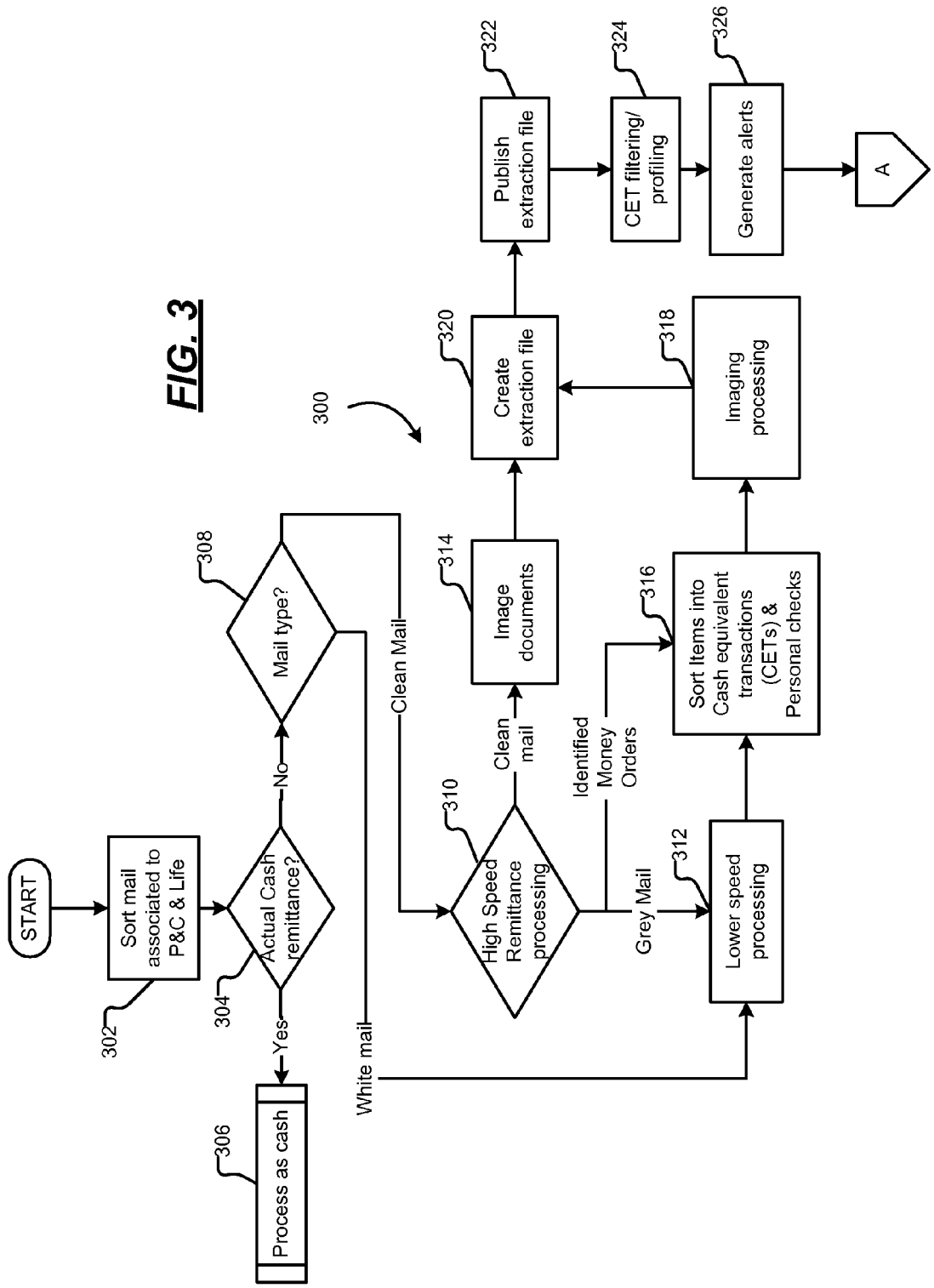
FIGS. 3-7 are example operational process flows that further detail the operational flow of FIG. 2.

FIG. 2 is an example operational process flow 200 for receiving remittances and determining compliance of cash equivalent transactions (CET) with statutory regulations. At 202, remittances are received. For example, the financial institution 110 may receive remittances 125 from the customers 120 as payment for P&C or life insurance policies offered by the financial institution 110. The remittances 125 may be received by mail at a drop box or other central location for processing. The remittances 125 may also be receive by a payment processor for the financial institution. It is noted that "a payment processor" and "a financial institution" may have the same meaning herein.

At 204, images of the remittances are captured. The remittance processing/capture platform 130 may capture images of documents contained in the remittances 125 for storage in the database 140 and later processing by the compliance engine 150. At 206, it is determined if a remittance is a cash equivalent transaction (CET). This may be performed by an analyst who will examine the image of the captured document from 204 to determine if the document is a CET or a personal check. If, at 206, it is determined that it is not a CET (i.e., the remittance is a personal check), then at 208, the remittance is processed as a non-CET transaction. The process 200 may then end at 230.

If the 206, it is determined that the transaction is a CET, then at 210, the images of the transaction are reviewed. The analyst may review the images of the document associated with the CET and/or other information associated with the CET (e.g., the MICR line) and determine an account number and/or routing number associated with imaged document. As noted, this information may be obtained from the MICR line of the document. In some implementations, a customer number or some other unique identifier of the customer 120 may be associated with the information obtained from the document to correlate the CET with a customer or individual for compliance processing.

At 212, is determined if the information associated with the document reviewed at 210 has been previously reviewed. For example, it may be determined the account number and/or routing number has been placed on a list of account numbers and/or routing numbers for documents associated with CET transactions. If not, then at 214, the information obtained at 210 may be stored. The images, account number, routing number and customer number may be stored in the database 140 or placed in the list.

At 216, compliance processing is performed. The compliance processing at 216 may be performed after 214 or after 212 if the document had been previously reviewed (by looking up and finding the information in the list). The compliance processing may be performed by the compliance engine 150 determine if there is a likelihood of suspicious activity associated with the transaction under review. The compliance engine 150 may examine the customer 120 and an aggregate an amount associated with CETs previously associated with the customer 120. For example, if the customer had multiple, related CETs that individually did not equal or exceed $10,000, but in the aggregate exceeded $10,000 an alert may be generated at 220. Additionally or alternatively, a single CET may exceed $10,000 and generate an alert at 220. The alert may be passed on to analyst for further review and the process ends at 230.

Thus, the operational flow 200 provides a mechanism whereby a document associated with a CET is examined by an analyst a first time the document is encountered and information identifying the document is put on a list. A subsequent encounter with the document does not require analyst intervention as the document is assumed to be associated with a CET because the information identifying the document is already in the list.

FIGS. 3-7 are example operational process flows 300 and 400 that further detail the operation flow 200 of FIG. 2. The operational process flows 300 and 400 include additional, optional and/or alternative steps that may be performed to meet a compliance requirement imposed by e.g., a country's laws or regulations. At 302, remittances received by mail are sorted and associated into P&C and life insurance products. At 304, it is determined if a remittance under review is an actual cash remittance. If so, then at 306, the remittance is processed according to cash remittance process. Information associated with the actual cash remittance, such as a customer number or a unique identifier of the customer may be used to update a profile associated with the customer to track cash transactions and to determine reporting requirements.

If it 304, it is determined that the remittance is not an actual cash remittance, then at 308, a type of mail of the remittance is determined. For example, at 308, the mail may be either "clean mail" or "white mail." Clean mail is a remittance 125 received in a standard envelope provided by the financial institution 110 to the customers 120 for returning remittances. White mail is a remittance 125 that is received in a regular envelope. If, at 308, the remittance is clean mail, then at 310 the mail is processed using high-speed remittance processing. The clean mail may be processed by the remittance processing/capture platform 130 and imaged at 314. The imaging of paper documents associated with the remittance may capture data associated with the paper items within a particular remittance, such as account numbers, routing numbers, etc. An extraction file associated with the imaging process performed at 314 is then created at 320. The extraction file may be an XML file that is created by the remittance processing/capture platform 130.

If at 310, "grey mail" is found, then money orders contained within the remittances are identified. Grey mail may be mail that was received in an envelope provided by the financial institution 110, however might not contain expected documents within the envelope or may have been damaged during the high-speed processing at 310. As such, the grey mail may be processed using lower speed processing at 312. Also 312, if the mail was found to be white mail at 308, then the white mail may be processed using the lower speed processing. At 316, identified money orders and other items may be manually sorted into cash equivalent transactions and personal checks. Items may be fed as specific batches during processing.

At 318, image processing is performed. The remittance processing/capture platform 130 may image the grey mail and the white mail items to capture images of paper items within the remittances 125. Data from the items may be captured and stored within the database 140. With respect to the grey mail and white mail items processed at 318, the extraction file may be created or appended to include these items at 320.

After the extraction file is created at 320, the extraction file may be published (at 322). Here, the extraction file may be made available for the compliance engine 150 for compliance processing. At 324, CET filtering and profiling is performed, and at 326 alerts may be generated based on the profiling. An "alert" may be CETs that in the aggregate over a rolling 12 month period equal or exceed $10,000. The profiling and alerting may be performed by the compliance engine 150 and will be described in greater detail with respect to the operational flow 400 illustrated in FIGS. 6 and 7.

Figure 4:
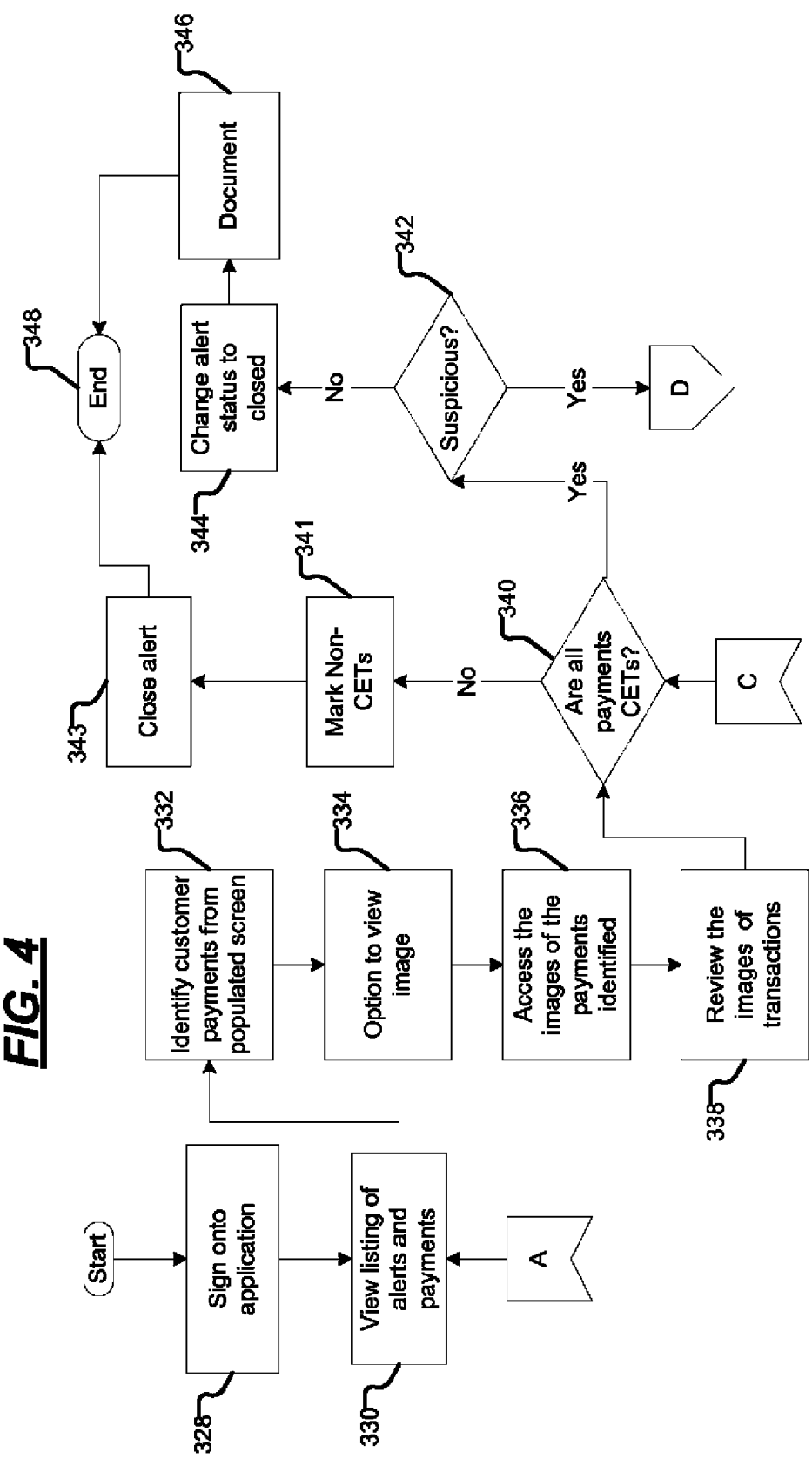
Figure 5:
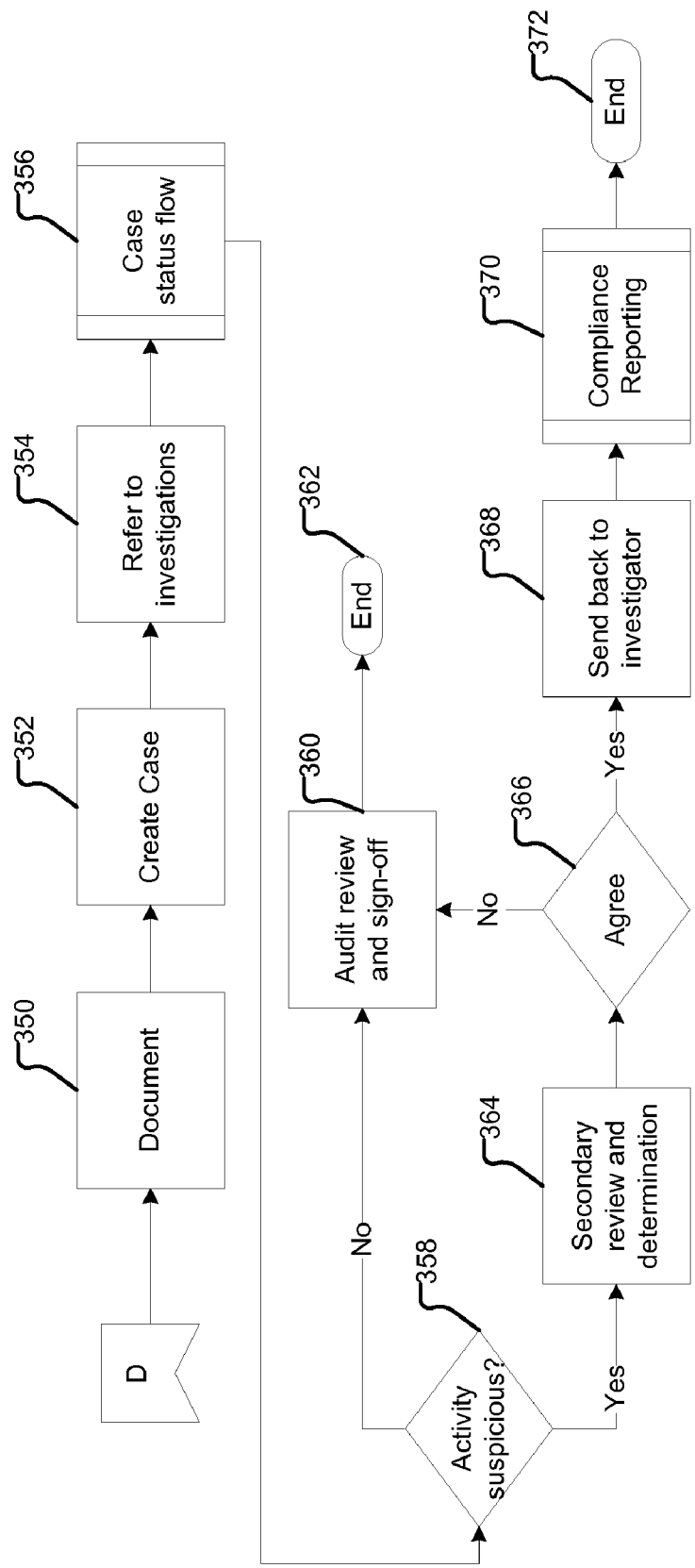

Referring to FIG. 4, an analyst may sign on to an application for viewing alerts and payments at 328. At 330, a listing of alerts and payments may be provided to the analyst. The listing may be generated based on the profiling and alerting performed in 324 and 326. At 332, CETs associated with a particular customer are populated in a user interface, and at 334, an option to view images of documents associated with the CETs is presented.

At 336, the analyst may access the images of the documents identified in the user interface presented at 332. At 338, the analyst may review the images, and at 340, determine if the transactions are all CETs. If transactions are all CETs, then at 342, it is determined if the activity appears to be suspicious. If the activity is not suspicious at 342, then at 344, the alert status is changed to closed. At 346, the analyst may document reasons why the CETs do not require compliance reporting and the process ends at 348.

If at 342, the activity does appear to be suspicious then at 350 (FIG. 5), the analyst may document reasons why the activity does appear to be suspicious. At 352, a case is created that is referred to an investigator at 354. At 356, a case status flow procedure may be performed by the investigator to determine if the activity is suspicious after a more detailed analysis. If it is determined at 358 at the activity is suspicious, then at 364, a secondary review may be performed. If the 358, the activity is not suspicious then an audit review and signoff may be performed at 360 and processing ends at 362.

Where there is suspicious activity at 358, and a secondary review is performed at 364, then at 366 it is determined if the secondary review agrees that there is suspicious activity. If not, then at 360, an audit review and signoff is performed and the process then ends at 362. Where there is agreement at 366, then the case sent back to the investigator at 368 for compliance reporting at 370. The process then ends at 372.

Referring again to FIG. 4, at 340, if the transactions are not all CETs, then at 341 the transactions are marked as non-CETs. At 343, the alert is closed and at 348, the process ends.

Figure 6:
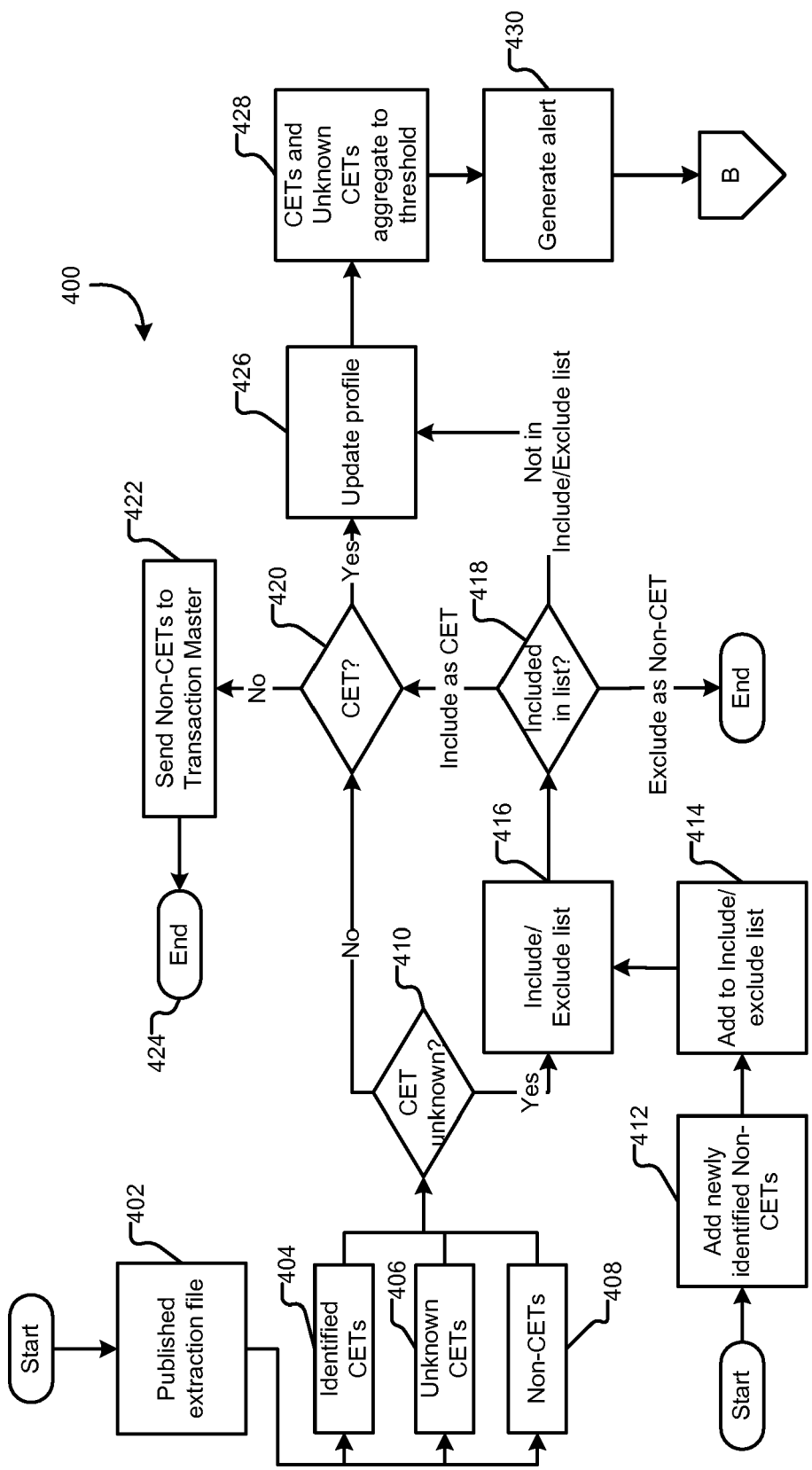
Figure 7:
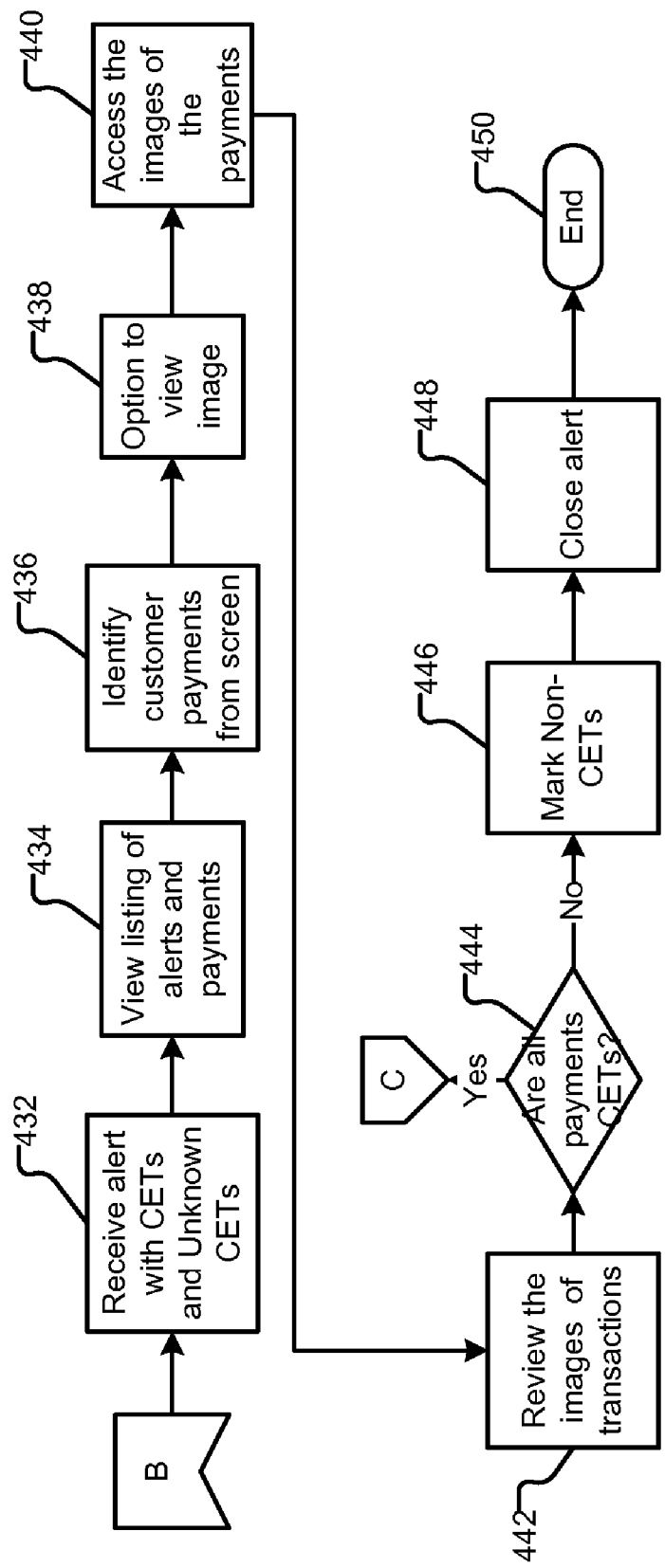

Referring now to FIGS. 6-7, there is illustrated an exemplary process 400 for compliance processing. The exemplary process 400 may be performed at 324 and 326, shown in FIG. 3. At 402, the published extraction file created or appended at 322 is received. The extraction file may be received by the compliance engine 150 for compliance processing. At 404, 406 and 408 identified CETs, unknown CETs and non-CETs are identified from the extraction file received at 402. At 410, it is determined if a particular CET is unknown. If the CET is unknown, an include/exclude is accessed at 416. The include/exclude list may include non-CETs identified by an analyst (at 412) that may be added to the include/exclude list at 414, or those added by the process 400. At 418, it is determined if the unknown CET from 410 should be included in the include/exclude list. If the transaction is to be excluded as a non-CET at 418, then the process ends. The CET may be excluded if an account number and routing number for the CET match a CET on the include/exclude list.

If it is to be included as a CET on the list at 418, then it is confirmed that the candidate CET is a CET at 420. Step 420 may be also be reached where a CET is not unknown at 410. If the CET is confirmed to be a CET at 420, then a profile associated with a customer or individual making the CET may be updated at 426. The profile may be associated with a customer 120 making the CET by a customer number or other identifier. In some implementations, the profile may be updated to indicate a false positive alert that will include a non-CET payment as a negative value to adjust the profile downward. The profile may be updated 426 in instances where the CET is not in the include/exclude list at 418.

At 428, if the CETs and unknown CETs in the profile aggregate to $10,000 (or more) within the profile, an alert is generated at 430. At 432 (FIG. 7), an analyst receives the alert generated at 430. As noted above, the alerts are CETs that aggregate to more than $10,000. At 434, a listing of alerts and payments may be provided to the analyst. The alert listing may be CETs that aggregated over a rolling 12 month period to $10,000 or more. At 436, payments associated with a particular customer are populated in a user interface, and at 438, an option to view images of documents associated with the payments is presented.

At 440, the analyst may access the images of the documents identified in the user interface presented at 434. At 442, the analyst may review the images of the documents, and at 444 determine if the transactions are all CETs. If all transactions are all CETs, then the process may return to 340 (FIG. 4) to determined if the activity appears to be suspicious. If, at 444, not all payments are CETs, then at 446, the non-CETs are marked and the alert status is changed to closed at 448. The process then ends at 450.

Thus, FIGS. 3-7 illustrate processes to receive, review, image, and analyze cash equivalent transactions for regulatory and reporting compliance. A CET may be analyzed a first time by an analyst and subsequently compared to an include/exclude list to reduce or eliminate the need for human intervention during processing.

Figure 8:
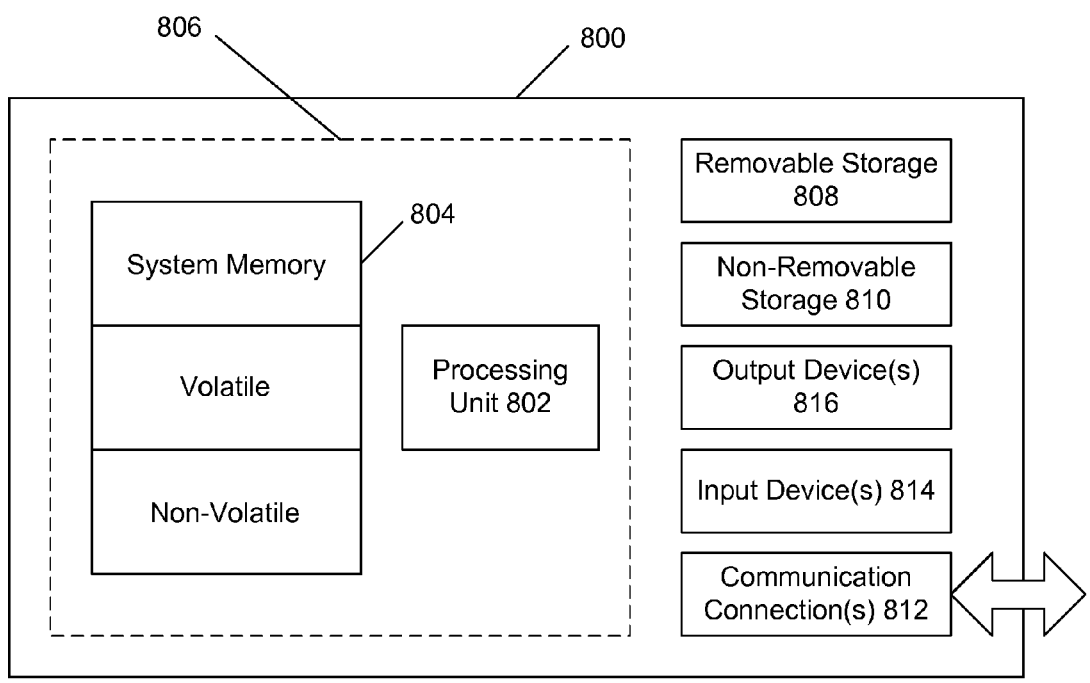
FIG. 8 shows an exemplary computing environment in which example embodiments and aspects may be implemented.

FIG. 8 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules being executed by a computer, may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and system memory 804. Depending on the exact configuration and type of computing device, system memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features and/or functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer-readable media. Computer-readable media can be any available media that can be accessed by computing device 800 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 804, removable storage 808, and non-removable storage 810 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may also contain communication connection(s) 812 that allow the computing device 800 to communicate with other devices. Communication connection(s) 812 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

Computing device 800 may be one of a plurality of computing devices 800 inter-connected by a network. As may be appreciated, the network may be any appropriate network, each computing device 800 may be connected thereto by way of communication connection(s) 812 in any appropriate manner, and each computing device 800 may communicate with one or more of the other computing devices 800 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program (s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for analyzing suspicious financial activity associated with an individual, comprising:
   utilizing a non-transitory computer-readable medium having stored thereon computer executable instructions executable by a processor for:
   receiving, a remittance associated with a customer at a financial institution, where the customer is a policy holder of insurance products provided by the financial institution and the remittance is payment for the insurance products from the customer to the financial institution;
   determining if the remittance is a cash equivalent transaction by analyzing a document associated with the remittance;
   identifying information associated with the document to uniquely identify the cash equivalent transaction;
   analyzing the information to determine if the document has been previously identified;
   determining a suspicious financial activity risk associated with the remittance based on the information;
   determining if an alert associated with the remittance is a false positive;
   in response to the alert being determined to be a false positive, correlating the false positive to the customer; and
   populating the information, the suspicious financial activity risk, and the false positive correlation into a list of identified documents, the list of identified documents associating the information, the suspicious financial activity risk, and the false positive correlation with documents known to be cash equivalent transactions.

2. The method of claim 1, further comprising:
   imaging the document; and
   extracting the information from an image of the document.

3. The method of claim 2, further comprising providing the image of the document to an analyst to identify the information associated with the document.

4. The method of claim 3, wherein the document is provided to the analyst a first time that the document is imaged.

5. The method of claim 4, further comprising determining that the document is a cash equivalent transaction upon subsequent review of the document by accessing the list of identified documents.

6. The method of claim 1, further comprising aggregating cash equivalent transactions associated with the individual over a predetermined period of time to determine the suspicious financial activity.

7. The method of claim 6, further comprising reporting an amount associated with the cash equivalent transactions associated with the individual if the amount exceeds a threshold.

8. A non-transitory computer-readable medium comprising computer-readable instructions for analyzing suspicious financial activity associated with an individual, the instructions comprising:
   receiving, a remittance associated with a customer at a financial institution, where the customer is a policy holder of insurance products provided by the financial institution and the remittance is payment for the insurance products from the customer to the financial institution;
   determining if the remittance is a cash equivalent transaction by analyzing a document associated with the remittance;
   identifying information associated with the document to uniquely identify the cash equivalent transaction;
   analyzing the information to determine if the document has been previously identified;
   determining a suspicious financial activity risk associated with the remittance based on the information;
   determining if an alert associated with the remittance is a false positive;
   in response to the alert being determined to be a false positive, correlating the false positive to the customer; and populating the information, the suspicious financial activity risk, and the false positive correlation into a list of identified documents, the list of identified documents associating the information, the suspicious financial activity risk, and the false positive correlation with documents known to be cash equivalent transactions.

9. The computer-readable medium of claim 8, further comprising instructions for:
   imaging the document; and
   extracting the information from an image of the document.

10. The computer-readable medium of claim 9, further comprising instructions for providing the image of the document to an analyst to identify the information associated with the document.

11. The computer-readable medium of claim 10, wherein the document is provided to the analyst a first time that the document is imaged.

12. The computer-readable medium of claim 11, further comprising instructions for determining that the document is a cash equivalent transaction upon subsequent review of the document by accessing the list of identified documents.

13. The computer-readable medium of claim 8, further comprising instructions for aggregating cash equivalent transactions associated with the individual over a predetermined period of time to determine the suspicious financial activity.

14. The computer-readable medium of claim 13, further comprising instructions for reporting an amount associated with the cash equivalent transactions associated with the individual if the amount exceeds a threshold.

15. A system for analyzing suspicious financial activity associated with an individual, comprising:
   a processor; and
   memory, wherein the memory stores processor executable instructions configured to:
   receive a remittance associated with a customer at a financial institution, where the customer is a policy holder of insurance products provided by the financial institution and the remittance is payment for the insurance products from the customer to the financial institution;
   determine if the remittance is a cash equivalent transaction by analyzing a document associated with the remittance;
   identify information associated with the document to uniquely identify the cash equivalent transaction;
   analyze the information to determine if the document has been previously identified;
   determine a suspicious financial activity risk associated with the remittance based on the information;
   that determines if an alert associated with the remittance is a false positive;
   correlate, in response to the alert being determined to be a false positive, the false positive to the customer; and
   populate the information, the suspicious financial activity risk, and the false positive correlation into a list of identified documents, the list of identified documents associating the information, the suspicious financial activity risk, and the false positive correlation with documents known to be cash equivalent transactions.

16. The system of claim 15, further comprising executable instructions configured to:
   image the document; and
   extract the information from an image of the document.

17. The system of claim 16, further comprising executable instructions configured to provide the image of the document to an analyst to identify the information associated with the document.

18. The system of claim 17, wherein the document is provided to the analyst a first time that the document is imaged.

19. The system of claim 18, further comprising executable instructions configured to determine that the document is a cash equivalent transaction upon subsequent review of the document by accessing the list of identified documents.

20. The system of claim 15, further comprising executable instructions configured to aggregate cash equivalent transactions associated with the individual over a predetermined period of time to determine the suspicious financial activity.

21. The system of claim 20, further comprising executable instructions configured to report an amount associated with the cash equivalent transactions associated with the individual if the amount exceeds a threshold.

* * * * *